(12) United States Patent
Archer et al.

(10) Patent No.: US 8,549,259 B2
(45) Date of Patent: Oct. 1, 2013

(54) PERFORMING A VECTOR COLLECTIVE OPERATION ON A PARALLEL COMPUTER HAVING A PLURALITY OF COMPUTE NODES

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 12/882,295

(22) Filed: Sep. 15, 2010

(65) Prior Publication Data

US 2012/0066310 A1 Mar. 15, 2012

(51) Int. Cl.
*G06F 15/76* (2006.01)
(52) U.S. Cl.
USPC ............................................. 712/16; 712/17
(58) Field of Classification Search
USPC ........................................ 709/205, 216–217
See application file for complete search history.

(56) References Cited

U.S. PATENT DOCUMENTS

| 4,325,120 | A | * | 4/1982 | Colley et al. | 711/202 |
|---|---|---|---|---|---|
| 5,212,778 | A | * | 5/1993 | Dally et al. | 711/218 |
| 6,192,384 | B1 | * | 2/2001 | Dally et al. | 708/200 |
| 6,292,822 | B1 | * | 9/2001 | Hardwick | 718/105 |
| 7,555,549 | B1 | * | 6/2009 | Campbell et al. | 709/224 |
| 7,827,385 | B2 | * | 11/2010 | Almasi et al. | 712/16 |
| 8,281,053 | B2 | * | 10/2012 | Archer et al. | 710/52 |
| 2005/0097300 | A1 | * | 5/2005 | Gildea et al. | 712/11 |
| 2007/0245122 | A1 | * | 10/2007 | Archer et al. | 712/17 |
| 2009/0006808 | A1 | * | 1/2009 | Blumrich et al. | 712/12 |
| 2009/0037511 | A1 | * | 2/2009 | Almasi et al. | 709/201 |

OTHER PUBLICATIONS

Amestoy, P. R., Duff, I. S., and Puglisi, C., Multifrontal QR factorization in a multiprocessor environment, Jul./Aug. 1996, Numerical Linear Algebra with Applications vol. 3, Iss4, pp. 275-300 (1-25).*

* cited by examiner

*Primary Examiner* — Lance L Barry
(74) *Attorney, Agent, or Firm* — Patterson & Sheridan LLP

(57) ABSTRACT

Systems, methods and articles of manufacture are disclosed for performing a vector collective operation on a parallel computing system that includes multiple compute nodes and a network connecting the compute nodes that includes an ALU. A collective operation may be performed to determine displacements for the vector collective operation. Descriptors for the vector collective operation may be generated based on the displacements. The vector collective operation may then be performed using the descriptors.

21 Claims, 5 Drawing Sheets

PERFORMING A VECTOR COLLECTIVE OPERATION ON A PARALLEL COMPUTER HAVING A PLURALITY OF COMPUTE NODES

BACKGROUND

1. Field

Embodiments of the invention relate generally to parallel processing and more particularly to techniques for performing collective operations on a parallel computing system having multiple networks.

2. Description of the Related Art

Powerful computers may be designed as highly parallel systems where the processing activity of hundreds, if not thousands, of central processing units (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., computer-generated imagery animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

IBM has developed a successor to the Blue Gene/L system, named Blue Gene/P. Blue Gene/P is designed to be the first computer system to operate at a sustained 1 petaflops (1 quadrillion floating-point operations per second). Like the Blue Gene/L system, the Blue Gene/P system is scalable with a projected maximum of 73,728 compute nodes. Each compute node in Blue Gene/P is projected to include a single application specific integrated circuit (ASIC) with 4 CPU's and memory. A complete Blue Gene/P system is designed to include 72 racks with 32 node boards per rack.

In addition to the Blue Gene architecture developed by IBM, other highly parallel computer systems have been (and are being) developed. For example, a Beowulf cluster may be built from a collection of commodity off-the-shelf personal computers. In a Beowulf cluster, individual computer systems are connected using local area network technology (e.g., Ethernet) and system software is used to execute programs written for parallel processing on the cluster.

The compute nodes in a parallel system communicate with one another over one or more communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and to distribute data among a set of compute nodes. Other parallel architectures (e.g., a Beowulf cluster) also use MPI and ARMCI for data communication between compute nodes. Of course, other message passing interfaces have been (and are being) developed. Low level network interfaces communicate higher level messages using small messages known as packets. Typically, MPI messages are encapsulated in a set of packets which are transmitted from a source node to a destination node over a communications network (e.g., the torus network of a Blue Gene system).

SUMMARY

One embodiment of the invention includes a method for performing a vector collective operation on a parallel computer comprising a plurality of compute nodes, each compute node having at least a processor and a memory. The method may generally include performing a collective operation by the plurality of compute nodes to determine a plurality of displacements for the vector collective operation. The method further may include generating descriptors for the vector collective operation based on the plurality of displacements. The method further may include performing the vector collective operation by the plurality of compute nodes using the generated descriptors.

Another embodiment of the invention includes a computer-readable storage medium containing a program which, when executed, performs an operation to perform a vector collective operation on a parallel computer comprising a plurality of compute nodes, each compute node having at least a processor and a memory. The operation may generally include performing a collective operation by the plurality of compute nodes to determine a plurality of displacements for the vector collective operation. The operation further may include generating descriptors for the vector collective operation based on the plurality of displacements. The operation further may include performing the vector collective operation by the plurality of compute nodes using the generated descriptors.

Another embodiment of the invention includes a parallel computing system. The system generally includes a plurality of compute nodes, each having at least a processor and a memory, wherein the plurality of compute nodes are configured to perform an operation. The operation may generally include performing a collective operation by the plurality of compute nodes to determine a plurality of displacements for a vector collective operation. The operation further may include generating descriptors for the vector collective operation based on the plurality of displacements. The operation further may include performing the vector collective operation by the plurality of compute nodes using the generated descriptors.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
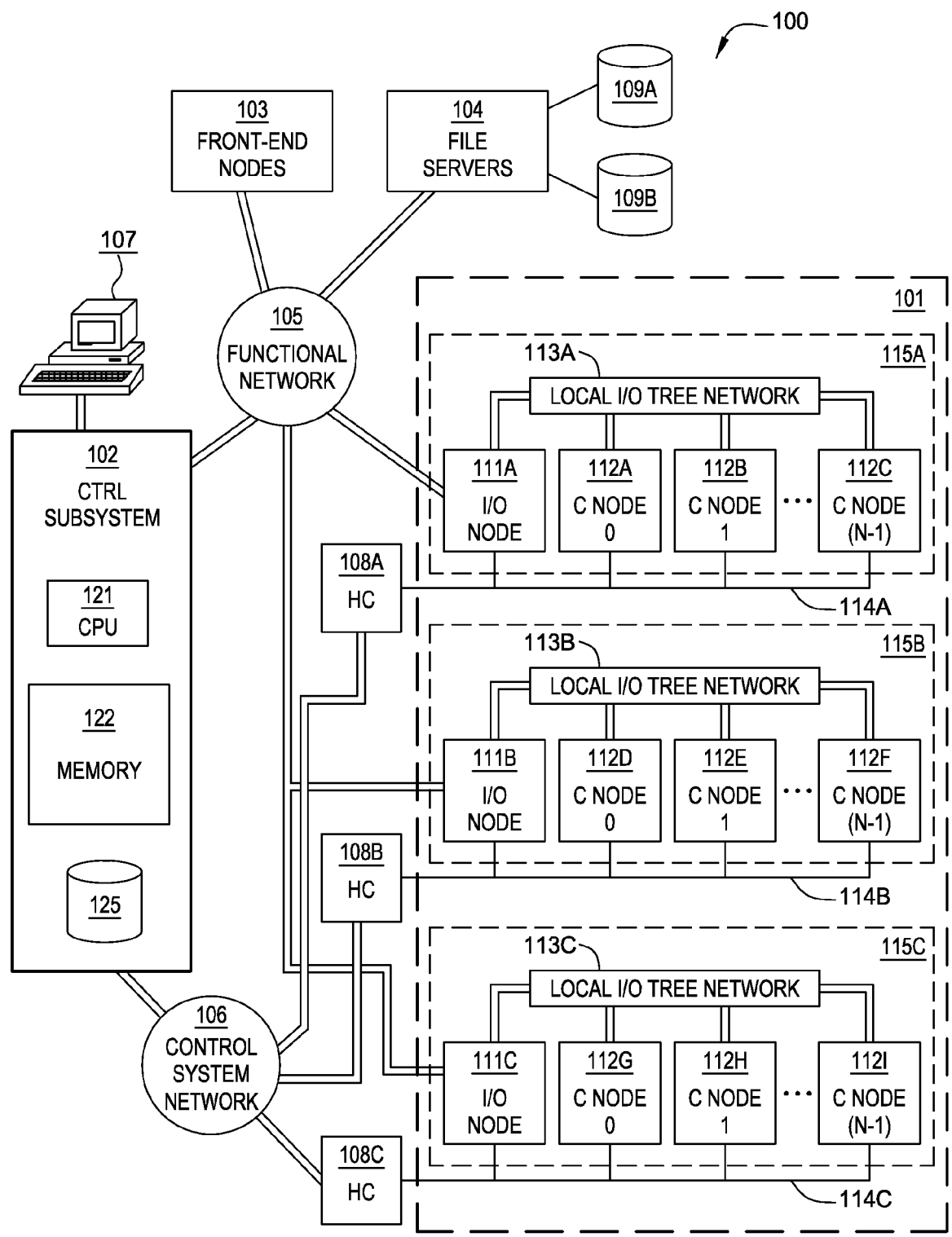
FIG. 1 is a block diagram of components of a massively parallel computer system, according to one embodiment of the present invention.

Embodiments of the invention provide techniques that combine multiple networks to perform point-to-point communication between compute nodes of a parallel computer. The point-to-point communication may perform a desired collective operation for the compute nodes of the parallel computer. A collective operation generally refers to a message-passing instruction that is executed simultaneously (or approximately so) by all the compute nodes of an operational group of compute nodes. The operational group may include a specified collection of the compute nodes in the parallel computing system. An operational group may be implemented, for example, as an MPI "communicator" object. Examples of collective operations include a broadcast operation, a reduce operation, and an allreduce operation. A broadcast operation is a collective operation for moving data among compute nodes of an operational group. A reduce operation is a collective operation that executes arithmetic or logical functions on data distributed among the compute notes of an operational group. An allreduce operation functions as a reduce operation, followed by a broadcast (to store the result of the reduce operation in the result buffer of each process). Further, depending on the implementation of the allreduce operation, the allreduce operation may be more efficient than the reduce followed by the broadcast (e.g., depending on the data involved in the allreduce operation).

Some collective operations have a single originating or receiving process running on a particular node in an operational group. For example, in a broadcast operation, the process on the compute note that distributes the data to all the other compute nodes is an originating process. In a gather operation, the process on the compute node that receives data from all the other compute nodes is a receiving process. The compute node on which such an originating or receiving process runs is referred to as a logical root. The originating or receiving process may also be referred to as the root process.

A "message passing protocol" is a set of instructions specifying how to create a set of packets from a message and how to reconstruct the message from a packet stream. Message passing protocols may be used to transmit packets in different ways depending on the desired communication characteristics. In a parallel system where a compute node has multiple communication links to other nodes, each compute node can send a point-to-point message to any other node. Additionally, packets may be "fully described" in which part of the packet payload stores metadata describing the message or "partially described" in which most packet metadata is omitted from individual packets. Fully described packets may be transmitted at any time, and may be routed dynamically. In contrast, partially described packets require a communication context to be previously established between a message sender and receiver.

On both a Blue Gene system and other parallel computing systems, low latency messaging is often implemented using a low latency protocol (sometimes called eager messages) and high bandwidth messaging is implemented using a high bandwidth protocol (sometimes called rendezvous messages). Which message passing protocol is used may depend on cutoffs based on message size.

To achieve low message latency, a low latency protocol may specify to send a fully described initial packet followed by partially described data packets and to route all packets deterministically to maintain packet order. Alternatively, such a protocol may specify to send only fully described packets and to route the packets dynamically. In either case, the low latency protocol provides a low bandwidth due to the requirement that all packets be fully (or partially) described. This requirement limits the amount of message data that may be included in each individual packet. Further, because deterministically routed packets each take the same route from a source to a destination, there is no opportunity to "route around" any congested network segments.

In contrast, to achieve high message bandwidth, a message passing protocol may specify to transmit partially described packets and to have packets routed dynamically. This protocol maximizes both the amount of data to be transmitted as well as the number of packets transmitted per unit time. However, the high bandwidth protocol requires a communication context be initialized between a source and destination node before the high level message (e.g., an MPI message) is sent. Typically, to establish the communication context, a source node transmits a "request to send" packet to destination node. In response, the destination node sets up a communication context for the message and returns a "clear to send" message to the source node. During this initialization, no data packets are sent. Thus, high bandwidth protocols provide limited latency, as the communication context needs to be initialized before any data packets containing the actual message are transmitted.

Different networks connecting the compute nodes of the parallel computer have different characteristics. For example, a first network may support transferring data with a lower latency than a second network, while the second network may support transferring data at a higher bandwidth than the first network. For instance, the compute nodes of the parallel computer may be connected by both a collective network (lower latency) and a point-to-point network, such as a torus network (higher bandwidth). As another example, a cluster may be built using relatively inexpensive double data rate (DDR) 1× InfiniBand cards for low latency data transfers and relatively inexpensive gigabit Ethernet cards for high bandwidth data transfers. In this case, the compute nodes of the parallel computer may be connected by both an InfiniB and network (lower latency) and a gigabit Ethernet network (higher bandwidth).

One or more of the different networks may include a built-in arithmetic logic unit (ALU). For example, on Blue Gene/L and Blue Gene/P, the collective network includes a built-in ALU. Further, on Blue Gene/Q, the torus network includes a built-in ALU. In one embodiment, the ALU may be used to construct descriptors. For example, the ALU may be used to construct descriptors in vector variants of MPI operations.

The vector variants of MPI operations may require a displacement array and a length array. Examples of vector variants of MPI operations include scattery (the vector variant of a scatter operation) and gathery (the vector variant of a gather operation). Specifically, the displacement array and/or the length array may be computed using the ALU in the networking hardware, rather than using the processors of the compute nodes. Advantageously, the parallel computer may construct descriptors—and thus perform collective operations—more efficiently. In other words, the parallel computer may reduce latency associated with constructing descriptors for collective operations.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as Compact Disc Read-only memory (CD-ROM1 disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O collective network 113A-C. The I/O nodes, in turn, are connected to functional network 105, over which they communicate with I/O devices attached to file servers 104, or with other system components. Thus, the local I/O collective networks 113 may be viewed logically as extensions of functional network 105, and like functional network 105 are used for data I/O, although they are physically separated from functional network 105. One example of the collective network is a tree network.

Control subsystem 102 directs the operation of the compute nodes 112 in compute core 101. Control subsystem 102 is a computer that includes a processor (or processors) 121, internal memory 122, and local storage 125. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 111, and perform diagnostic and maintenance functions.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

In one embodiment, the computer system 100 determines, from among a plurality of class route identifiers for each of the compute nodes along a communications path from a source compute node to a target compute node in the network, a class route identifier available for all of the compute nodes along the communications path. The computer system 100 configures network hardware of each compute node along the communications path with routing instructions in dependence upon the available class route identifier and a network topology for the network. The routing instructions for each compute node associate the available class route identifier with the network links between that compute node and each compute node adjacent to that compute node along the communications path. The source compute node transmits a network packet to the target compute node along the communications path, which includes encoding the available class route identifier in a network packet. The network hardware of each compute node along the communications path routes the network packet to the target compute node in dependence upon the routing instructions for the network hardware of each compute node and the available class route identifier encoded in the network packet. As used herein, the source compute node is a compute node attempting to transmit a network packet, while the target compute node is a compute node intended as a final recipient of the network packet.

In one embodiment, a class route identifier is an identifier that specifies a set of routing instructions for use by a compute node in routing a particular network packet in the network. When a compute node receives a network packet, the network hardware of the compute node identifies the class route identifier from the header of the packet and then routes the packet according to the routing instructions associated with that particular class route identifier. Accordingly, by using different class route identifiers, a compute node may route network packets using different sets of routing instructions. The number of class route identifiers that each compute node is capable of utilizing may be finite and may typically depend on the number of bits allocated for storing the class route identifier. An "available" class route identifier is a class route identifier that is not actively utilized by the network hardware of a compute node to route network packets. For example, a compute node may be capable of utilizing sixteen class route identifiers labeled 0-15 but only actively utilize class route identifiers 0 and 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to a different adjacent compute node. In such a manner, two different routing configurations may exist among the same compute nodes on the same physical network.

Figure 2:
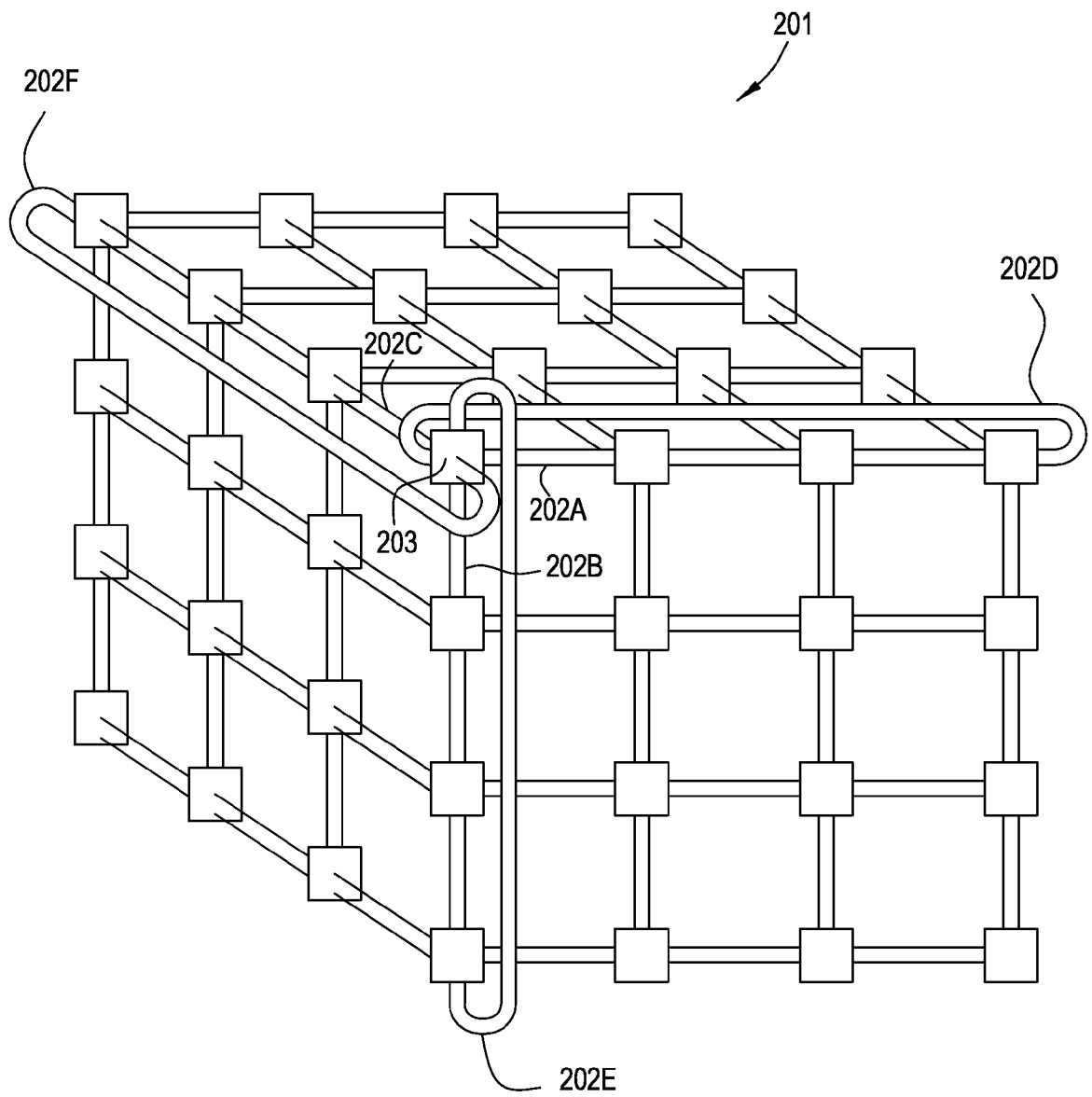
FIG. 2 is a conceptual illustration of a three-dimensional torus network of the system, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 2 by links 202D, 202E and 202F which wrap around from a last node in the x, y and z dimensions to a first node. Thus, although node 203 appears to be at a "corner" of the torus, node-to-node links 202A-F link node 203 to nodes 202D, 202E and 202F, in the x, y and z dimensions of torus 201.

Figure 3:
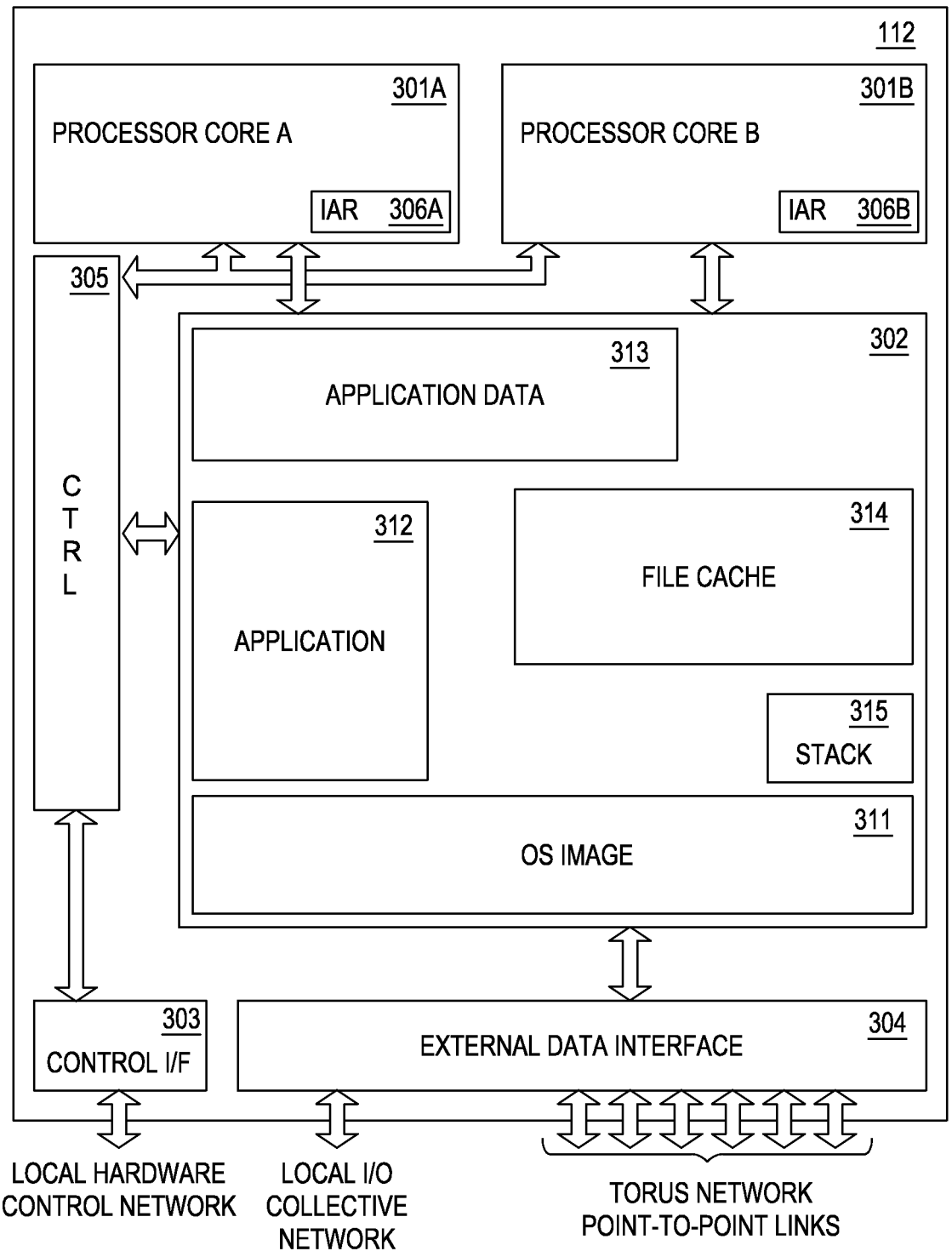
FIG. 3 is a diagram of a compute node of the system, according to one embodiment of the invention.

FIG. 3 is a diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O collective network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes include a minimal set of functions required to support operation of the compute node 112.

Application code image 312 represents a copy of the application code being executed by compute node 112. Application code image 302 may include a copy of a computer program being executed by system 100, but where the program is very large and complex, it may be subdivided into portions which are executed by different compute nodes 112. Memory 302 may also include a call-return stack 315 for storing the states of procedures which must be returned to, which is shown separate from application code image 302, although it may be considered part of application code state data.

As part of ongoing operations, application 312 may be configured to transmit messages from compute node 112 to other compute nodes in parallel system 100. For example, the high level MPI call of MPI_Send( ); may be used by application 312 to transmit a message from one compute node to another. On the other side of the communication, the receiving node may use the MPI call MPI_Recv( ) to receive and process the message. As described above, in a Blue Gene system, the external data interface 304 may be configured to transmit the high level MPI message by encapsulating it within a set of packets and transmitting the packets over the torus network of point-to-point links. Other parallel systems also include a mechanism for transmitting messages between different compute nodes. For example, nodes in a Beowulf cluster may communicate using a using a high-speed Ethernet style network.

In one embodiment, the application 312 may use vector variants of collective operations (or for short, vector collective operations). Examples of vector collective operations include gatherv, scatterv, allgathery and alltoallv. In order for the compute nodes to perform a vector collective operation, each compute node may construct a displacement array—from which the respective compute node may determine where (i.e., a memory location) to place data on the result buffer (e.g., of the root node), as part of the vector collective operation. In one embodiment, the displacement array may be given by:

$$\text{displacement}[i] = \text{length}[i] + \text{displacement}[i-1] \text{ for } i > 0, \quad \text{(Equation 1)}$$

where i uniquely identifies a compute node participating in the vector collective operation. For i=0, the displacement may be 0 or, alternatively, a base offset of the result buffer for performing the vector collective operation. To illustrate the displacement array, in the case of four compute nodes participating in the vector collective operation, if the lengths of messages of each of the compute nodes are 3, 5, 10, and 4, respectively, then the displacement array is given by: [0, 3, 3+5, 3+5+10, 3+5+10+4]=[0, 3, 8, 18, 22]. In alternative embodiments, the first element and/or the last element of the displacement array may be omitted from the displacement array, to produce a displacement array that is equal to or less than the count of compute nodes participating in the vector collective operation. For example, in alternative embodiments, the displacement array may be [3, 8, 18, 22] or [0, 3, 8, 18] or any array containing the values [3, 8, 18].

In one embodiment, the application 312 may use the ALU in the collective network to compute the displacement array more efficiently. For example, the compute nodes may perform an allreduce operation to compute the displacement array. When used in conjunction with direct memory access (DMA), the compute nodes may avoid having to perform a rendezvous message step to compute the displacement array. To further illustrate performing the allreduce operation to compute the displacement array, the following Figures are provided.

Figure 4:
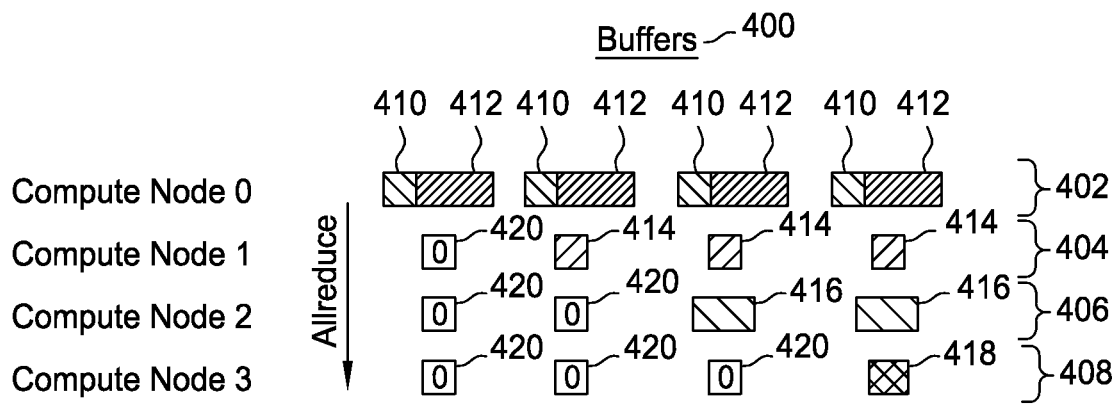
FIG. 4 illustrates buffers of each compute node for a vector collective operation, according to one embodiment of the invention.

FIG. 4 illustrates buffers 400 of each compute node for a vector collective operation, according to one embodiment of the invention. Assume that four compute nodes participate in the vector collective operation: compute nodes 0 through 3. As shown, the buffers 400 include a first buffer 402 for compute node 0, a second buffer 404 for compute node 1, a third buffer 406 for compute node 2, and a fourth buffer 408 for compute node 3. In this particular example, each compute node stores a displacement contribution array in the respective buffer. The displacement contribution array for the respective compute node specifies the contribution of the respective compute node to displacements of each other compute node participating in the vector collective operation.

As shown, the displacement contribution array for each compute node stores four displacement contribution values. Assume that the first displacement contribution value represents the displacement contribution to compute node 0, the second displacement contribution value represents the displacement contribution to compute node 1, and so on. For compute node 0, each displacement contribution value is the sum of: (i) a base offset 410 of the result buffer of the vector collective operation and (ii) a length 412 of the message of compute node 0 for the vector collective operation. This is because both the base offset 410 and the length 412 contribute to the displacement, in the result buffer, of each other compute node participating in the vector collective operation.

As shown, the displacement contribution array for compute node 1 stores a zero value, which indicates that compute node 1 does not contribute to the displacement of compute node 0. The displacement contribution array for compute node 1 stores three additional displacement contribution values, each of which is equal to the length 414 of the message of compute node 1 for the vector collective operation. In other words, the length 414 contributes to the displacement, in the result buffer, of compute nodes 1-3.

As shown, the displacement contribution array for compute node 2 stores two zero values, which indicates that compute node 2 does not contribute to the displacements of compute nodes 0-1. The displacement contribution array for compute node 2 stores two additional displacement contribution values, each of which is equal to the length 416 of the message of compute node 2 for the vector collective operation. In other words, the length 416 contributes to the displacement, in the result buffer, of compute nodes 2-3.

As shown, the displacement contribution array for compute node 3 stores three zero values, which indicates that compute node 3 does not contribute to the displacements of compute nodes 0-2. The displacement contribution array for compute node 3 stores one additional displacement contribution value that is equal to the length 418 of the message of compute node 3 for the vector collective operation. In other words, the length 418 contributes to the displacement, in the result buffer, of compute node 3.

Figure 5:
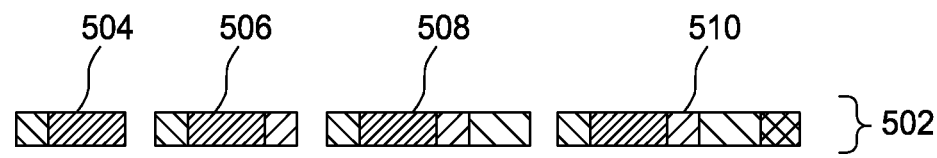
FIG. 5 illustrates the displacement array produced by the compute nodes, according to one embodiment of the invention.

In one embodiment, the compute nodes may perform an allreduce operation to sum the displacement contribution arrays of the respective compute nodes. For example, the compute nodes may perform an MPI_SUM over the collective network to produce a displacement array. As a result of the allreduce operation, each compute node receives a copy of the displacement array. FIG. 5 illustrates the displacement array 502 produced by the allreduce operation, according to one embodiment of the invention. As shown, the displacement array 502 stores four displacement values. The first displacement value 504, obtained from summing the first element of each displacement contribution array, is equal to the sum of: (i) the base offset 410 of the result buffer of the vector collective operation and (ii) the length 412 of the message of compute node 0 for the vector collective operation.

Similarly, the second displacement value 506, obtained from summing the second element of each displacement contribution array, is equal to the sum of the first displacement value 504 and the length 414 of the message of compute node 1 for the vector collective operation. Likewise, the third displacement value 508 is equal to the sum of the second displacement value 506 and the length 416 of the message of compute node 2 for the vector collective operation. The fourth displacement value 510 is equal to the sum of the third displacement value 508 and the length 418 of the message of compute node 3 for the vector collective operation.

As described above, each compute node receives a copy of the displacement array 502 as a result of the allreduce operation. Accordingly, each compute node is notified of the displacement of the respective compute node, where the displacement is computed from lengths of messages of other compute nodes participating in the vector collective operation. In one embodiment, the application 312 may construct descriptors for a remote put operation (or remote get operation, depending on the vector collective operation being performed).

Figure 6:
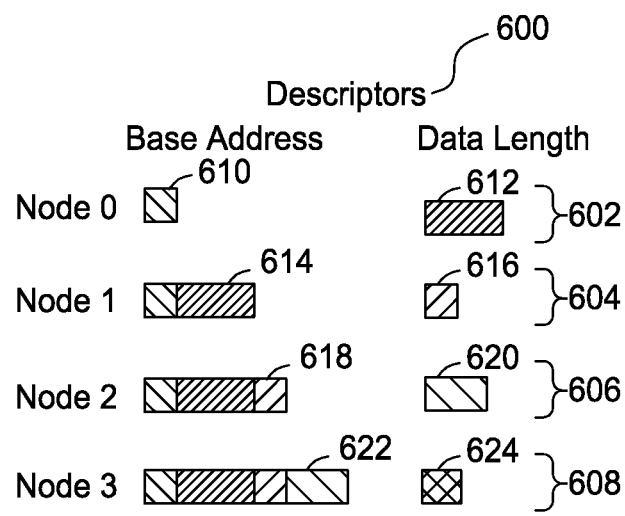
FIG. 6 illustrates descriptors constructed from the displacement array, according to one embodiment of the invention.

FIG. 6 illustrates descriptors 600 constructed from the displacement array 502 of FIG. 5, according to one embodiment of the invention. Viewing the displacement array 502 as a partial sum, the application 312 may construct the descriptors 600. As shown, the descriptors 600 include a first descriptor 602 for node 0, a second descriptor 604 for node 1, a third descriptor 606 for node 2, and a fourth descriptor for node 3. Each descriptor specifies: (i) a base address of data of the respective compute node for the vector collective operation and (ii) a length of the data.

As shown, the first descriptor 602 specifies: (i) a base address 610 equal to the base offset 410 of the result buffer of the vector collective operation and (ii) a length 612 equal to the length 412 of the message of compute node 0 for the vector collective operation. The second descriptor 604 specifies: (i) a base address 614 equal to the sum of the base address 610 and the length 612 and (ii) a length 616 equal to the length 414 of the message of compute node 1 for the vector collective operation.

Similarly, the third descriptor 606 specifies: (i) a base address 618 equal to the sum of the base address 614 and the length 616 and (ii) a length 620 equal to the length 416 of the message of compute node 3 for the vector collective operation. Likewise, the fourth descriptor 608 specifies: (i) a base address 622 equal to the sum of the base address 618 and the length 620 and (ii) a length 624 equal to the length 418 of the message of compute node 3 for the vector collective operation. The compute nodes may then perform the vector collective operation using the generated descriptors 600.

Advantageously, the application 312 may generate the descriptors 600 for performing the vector collective operation using the ALU hardware in the collective network—and hence, with reduced involvement from the processors of the compute nodes. Specifically, the processors of the compute nodes need not be involved in computing the base addresses of the descriptors for each compute node for the vector collective operation. Consequently, the application 312 may reduce latency associated with performing the vector collective operation.

Of course, those skilled in the art will recognize that the specific way of constructing descriptors from the displacement array 502 may vary depending on the particular embodiment. For example, to determine the base address for compute node 2, the application 312 may subtract the length 620 from the third displacement value 508 of the displacement array 502. Alternatively, the application 312 may obtain the base address for compute node 2 from the second displacement value 506 of the displacement array 502.

Figure 7:
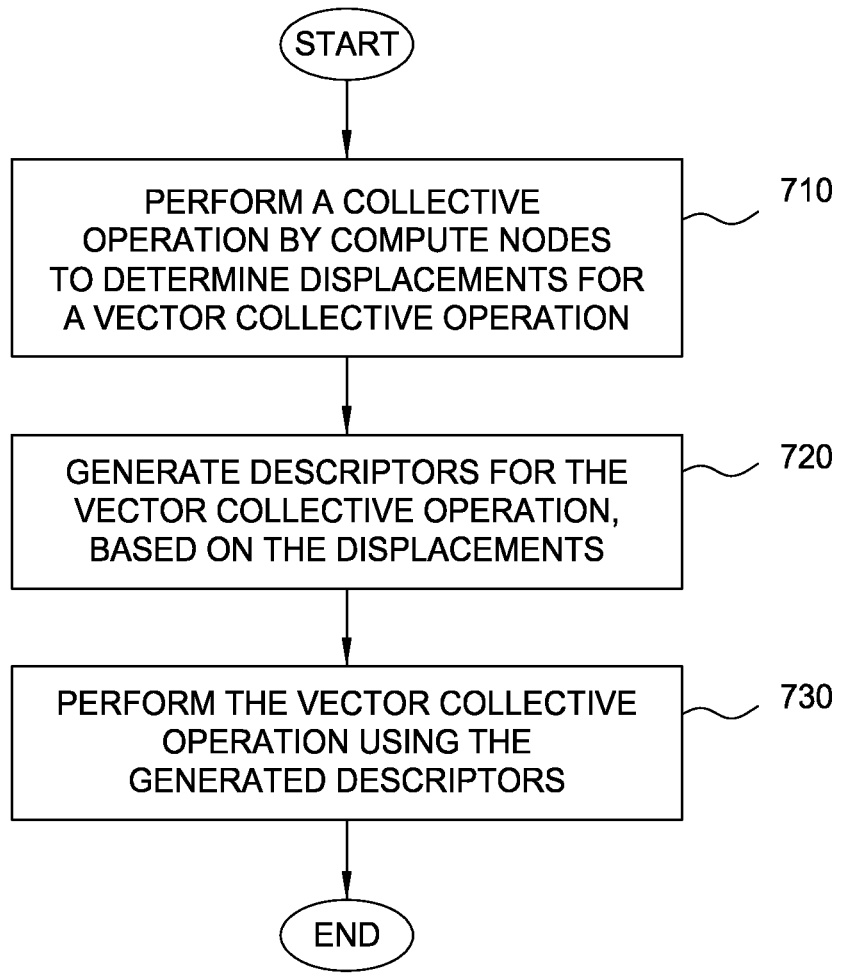
FIG. 7 is a flow diagram depicting a method for performing a vector collective operation, according to one embodiment of the invention.

FIG. 7 is a flow diagram depicting a method 700 for performing a vector collective operation, according to one embodiment of the invention. As shown, the method 700 begins at step 710, where the compute nodes perform a collective operation to determine displacements for each compute node participating in the vector collective operation. For example, an allreduce operation may be performed to generate the displacement array 502 of FIG. 5. At step 720, the application 312 generates descriptors for the vector collective operation. For example, the descriptors 600 of FIG. 6 may be generated. At step 730, the compute nodes perform the vector collective operation using the generated descriptors. For example, the compute nodes may perform a scattery collective operation using the descriptors 600 of FIG. 6. After the step 730, the method 700 terminates.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for performing a vector collective operation on a parallel computing system includes multiple compute nodes and a network connecting the compute nodes that includes ALU hardware. The compute nodes may perform a collective operation to determine displacements for performing the vector collective operation. One or more of the compute nodes may generate descriptors for the vector collective operation, based on the displacements. The compute nodes may then perform the vector collective operation using the descriptors. Advantageously, by using the ALU hardware rather than the processors of the compute nodes to determine the displacements, the descriptors may be generated more efficiently. Consequently, the vector collective operation may be performed more efficiently.

While the foregoing is directed to embodiments of the present invention, other and further embodiments of the invention may be devised without departing from the basic scope thereof, and the scope thereof is determined by the claims that follow.

What is claimed is:

1. A computer-implemented method to implement a vector collective operation on a parallel computer comprising a plurality of compute nodes operatively connected via a first network having a network processing element, each compute node having at least a processor and a memory, the method comprising:
    performing a collective operation using the network processing element, in order to determine a plurality of displacements for the vector collective operation;
    generating descriptors for the vector collective operation based on the plurality of displacements, wherein the descriptors for the vector collective operation comprise a descriptor for each of the plurality of compute nodes, and wherein each descriptor comprises a base address of data and a message length of the data for the respective compute node for performing the vector collective operation; and
    performing the vector collective operation by the plurality of compute nodes and using the generated descriptors.

2. The computer-implemented method of claim 1, wherein the plurality of displacements specifies a displacement for each of the plurality of compute nodes, and wherein each displacement comprises a memory location for storing data for the respective compute node for performing the vector collective operation.

3. The computer-implemented method of claim 1, wherein performing the collective operation comprises:
    storing, by each of the plurality of compute nodes, a displacement contribution array having a length of at least the count of the compute nodes, wherein the displacement contribution array specifies, for the respective compute node, the contribution of the respective compute node to a displacement of each other compute node; and
    determining the plurality of displacements by using an allreduce operation to sum the displacement contribution arrays.

4. The computer-implemented method of claim 3, wherein storing each displacement contribution array comprises:
    storing, by a first compute node, a plurality of displacement contributions, each comprising the sum of a base offset of data and a message length of the data of the first compute node for performing the vector collective operation; and
    storing, by each of the other compute nodes, a plurality of displacement contributions, each selected from at least one of zero and a message length of the data of the respective compute node for performing the vector collective operation, wherein each of the other compute nodes stores at least one zero displacement contribution, and wherein each of the other compute nodes stores a different total count of zero displacement contributions.

5. The computer-implemented method of claim 4, wherein the collective operation comprises an allreduce operation.

6. The computer-implemented method of claim 5, wherein the plurality of compute nodes is configured to independently perform each individual vector collective operation selected from gatherv, scatterv, allgathery and alltoallv.

7. A computer-readable memory containing a program which, when executed, performs an operation to implement a vector collective operation on a parallel computer comprising a plurality of compute nodes operatively connected via a first network having a network processing element, each compute node having at least a processor and a memory, the operation comprising:
    performing a collective operation using the network processing element, in order to determine a plurality of displacements for the vector collective operation;
    generating descriptors for the vector collective operation based on the plurality of displacements, wherein the descriptors for the vector collective operation comprise a descriptor for each of the plurality of compute nodes, and wherein each descriptor comprises a base address of data and a message length of the data for the respective compute node for performing the vector collective operation; and
    performing the vector collective operation by the plurality of compute nodes and using the generated descriptors.

8. The computer-readable memory of claim 7, wherein the plurality of displacements specifies a displacement for each of the plurality of compute nodes, and wherein each displacement comprises a memory location for storing data for the respective compute node for performing the vector collective operation.

9. The computer-readable memory of claim 8, wherein performing the collective operation comprises:
    storing, by each of the plurality of compute nodes, a displacement contribution array having a length of at least the count of the compute nodes, wherein the displacement contribution array specifies, for the respective compute node, the contribution of the respective compute node to a displacement of each other compute node; and
    determining the plurality of displacements by using an allreduce operation to sum the displacement contribution arrays.

10. The computer-readable memory of claim 9, wherein storing each displacement contribution array comprises:
    storing, by a first compute node, a plurality of displacement contributions, each comprising the sum of a base offset of data and a message length of the data of the first compute node for performing the vector collective operation; and
    storing, by each of the other compute nodes, a plurality of displacement contributions, each selected from at least one of zero and a message length of the data of the respective compute node for performing the vector collective operation, wherein each of the other compute nodes stores at least one zero displacement contribution, and wherein each of the other compute nodes stores a different total count of zero displacement contributions.

11. The computer-readable memory of claim 10, wherein the collective operation comprises an allreduce operation.

12. The computer-readable memory of claim 11, wherein the plurality of compute nodes is configured to independently perform each individual vector collective operation selected from gatherv, scatterv, allgathery and alltoallv.

13. A parallel computing system to implement a vector collective operation, the system comprising:
    a plurality of compute nodes operatively connected via a first network having a network processing element, each compute node having at least a processor and a memory, wherein the plurality of compute nodes are configured to perform an operation comprising:

performing a collective operation by the plurality of compute nodes using the network processing element, in order to determine a plurality of displacements for a vector collective operation;

generating descriptors for the vector collective operation based on the plurality of displacements, wherein the descriptors for the vector collective operation comprise a descriptor for each of the plurality of compute nodes, and wherein each descriptor comprises a base address of data and a message length of the data for the respective compute node for performing the vector collective operation; and performing the vector collective operation by the plurality of compute nodes and using the generated descriptors.

14. The parallel computing system of claim 13, wherein the plurality of displacements specifies a displacement for each of the plurality of compute nodes, and wherein each displacement comprises a memory location for storing data for the respective compute node for performing the vector collective operation.

15. The parallel computing system of claim 14, wherein performing the collective operation comprises:

storing, by each of the plurality of compute nodes, a displacement contribution array having a length of at least the count of the compute nodes, wherein the displacement contribution array specifies, for the respective compute node, the contribution of the respective compute node to a displacement of each other compute node; and determining the plurality of displacements by using an allreduce operation to sum the displacement contribution arrays.

16. The parallel computing system of claim 15, wherein storing each displacement contribution array comprises:

storing, by a first compute node, a plurality of displacement contributions, each comprising the sum of a base offset of data and a message length of the data of the first compute node for performing the vector collective operation; and storing, by each of the other compute nodes, a plurality of displacement contributions, each selected from at least one of zero and a message length of the data of the respective compute node for performing the vector collective operation, wherein each of the other compute nodes stores at least one zero displacement contribution, and wherein each of the other compute nodes stores a different total count of zero displacement contributions.

17. The parallel computing system of claim 16, wherein the collective operation comprises an allreduce operation.

18. The parallel computing system of claim 17, wherein the plurality of compute nodes is configured to independently perform each individual vector collective operation selected from gatherv, scatterv, allgatherv and alltoallv.

19. The parallel computer system of claim 18, wherein the plurality of compute nodes are operatively connected via each of a plurality of networks of distinct characteristics, wherein the plurality of networks includes the first network and a second network, wherein the first network is configured to transfer data with lower latency than the second network, wherein the second network is configured to transfer data at a higher bandwidth than the first network.

20. The parallel computer system of claim 19, wherein the network processing element is separate from the plurality of compute nodes, wherein the descriptors are provided via direct memory access (DMA) and not via any rendezvous messaging between the plurality of compute nodes, thereby avoiding latency otherwise incurred in determining the displacements by the plurality of compute nodes, wherein rendezvous messaging comprises messaging via the second network, wherein the first network comprises a collective network, wherein the second network comprises a point-to-point network.

21. The parallel computer system of claim 20, wherein each descriptor comprises a DMA descriptor, wherein the network processing element includes hardware and comprises an arithmetic logic unit (ALU), wherein the point-to-point network comprises a torus network.

* * * * *